(12) United States Patent
Buskirk et al.

(10) Patent No.: US 9,088,189 B2
(45) Date of Patent: Jul. 21, 2015

(54) LAMINATION STACK FOR AN ELECTRICAL MACHINE ROTOR AND ASSOCIATED METHOD OF MAKING

(75) Inventors: Eric S. Buskirk, Scotia, NY (US); Blake Weldon Wilson, Glenville, NY (US); Curtis Hebert, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 685 days.

(21) Appl. No.: 13/418,694

(22) Filed: Mar. 13, 2012

(65) Prior Publication Data
US 2013/0241339 A1    Sep. 19, 2013

(51) Int. Cl.
*H02K 1/27* (2006.01)

(52) U.S. Cl.
CPC ................................. *H02K 1/2766* (2013.01)

(58) Field of Classification Search
USPC .......................... 310/156.53, 156.56, 156.57
IPC .......................................... H02K 1/276,1/2776
See application file for complete search history.

(56) References Cited

U.S. PATENT DOCUMENTS

| | | |
|---|---|---|
| 4,177,360 A | 12/1979 | Fujimoto et al. |
| 4,405,873 A | 9/1983 | Nondahl |
| 4,464,596 A | 8/1984 | Miller et al. |
| 4,469,970 A | 9/1984 | Neumann |
| 5,117,553 A * | 6/1992 | Kliman ........................... 29/598 |
| 5,548,172 A | 8/1996 | Kliman et al. |
| 5,758,709 A | 6/1998 | Boyd, Jr. |
| 5,952,757 A | 9/1999 | Boyd, Jr. |
| 6,144,131 A | 11/2000 | Hollenbeck et al. |
| 6,777,847 B1 | 8/2004 | Saban et al. |
| 8,044,529 B2 | 10/2011 | Egedal |
| 2011/0291515 A1* | 12/2011 | Li et al. .................... 310/156.53 |
| 2013/0069470 A1* | 3/2013 | Jurkovic et al. .......... 310/156.53 |

* cited by examiner

*Primary Examiner* — Dang Le
(74) *Attorney, Agent, or Firm* — Dority & Manning, P.A.

(57) ABSTRACT

An electrical machine permanent magnet rotor (and associated method of making) includes a plurality of disc-shaped laminations arranged in a stacked configuration. Each of the laminations has a plurality of magnetic material slots circumferentially spaced around a peripheral portion thereof. A first set of the slots on each lamination has a material bridge between a radial end of the slot and an outer circumferential edge of the lamination. A second set of the slots on each lamination have a radial end that extends to the outer circumferential edge of the lamination and is void of the material bridge.

8 Claims, 5 Drawing Sheets

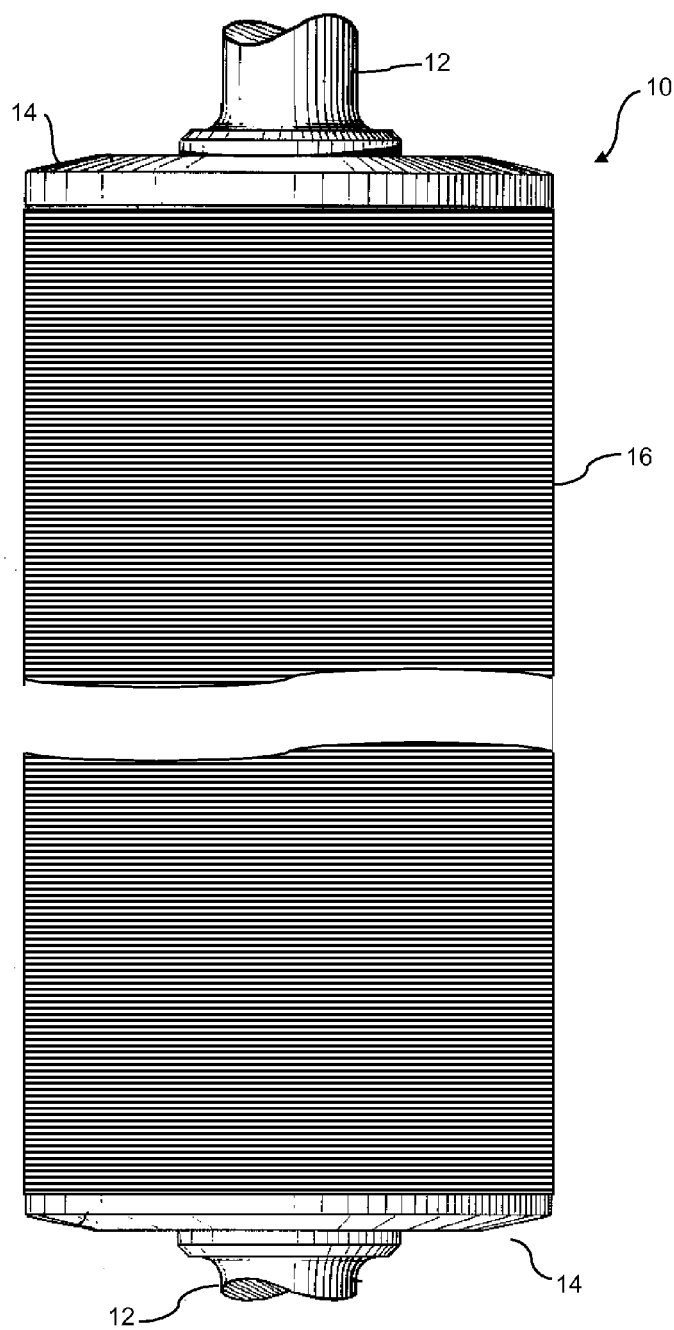
Fig. -1-

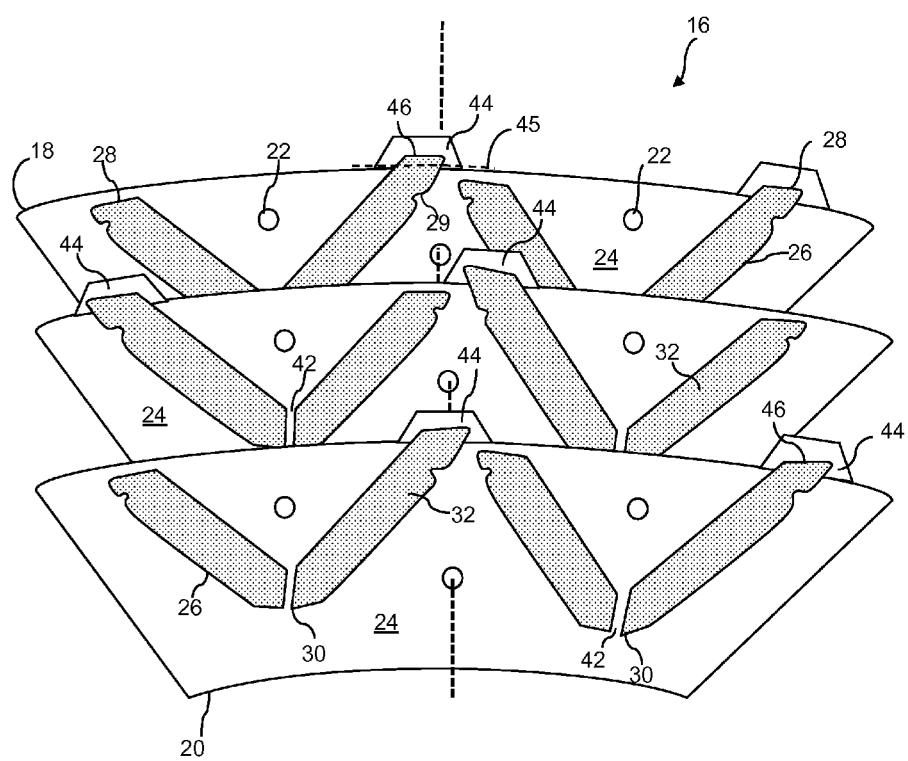
*Fig. -2-*

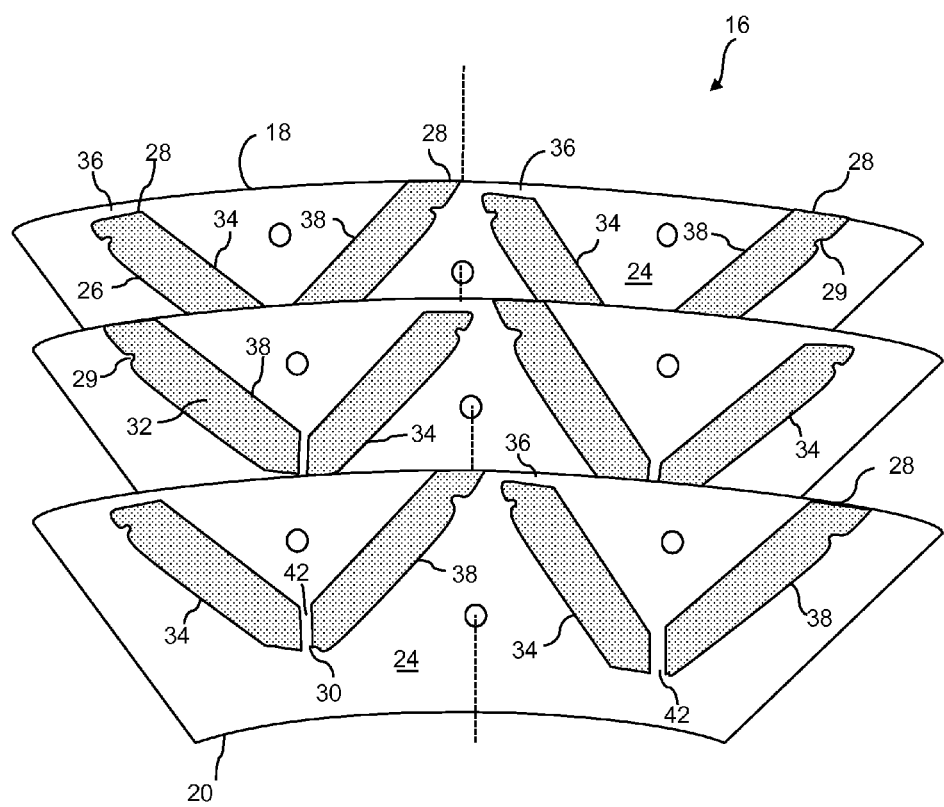
Fig. -3-

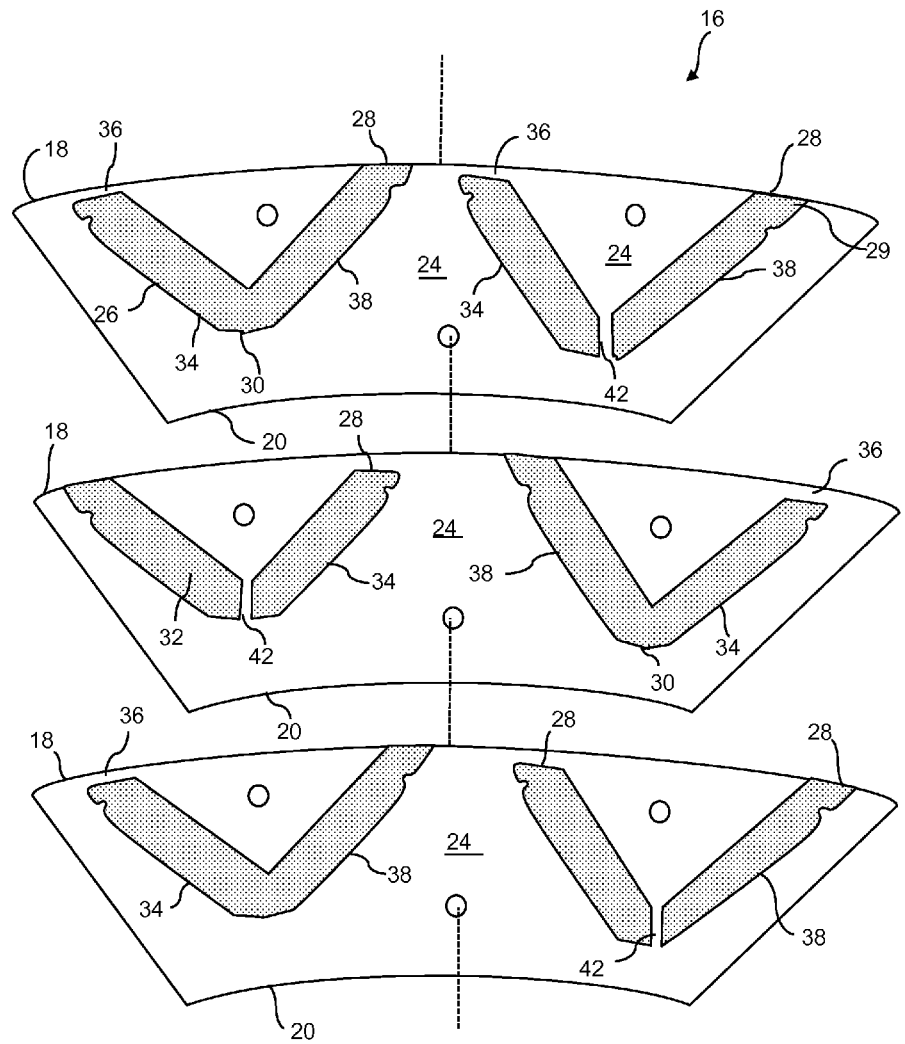
Fig. -4-

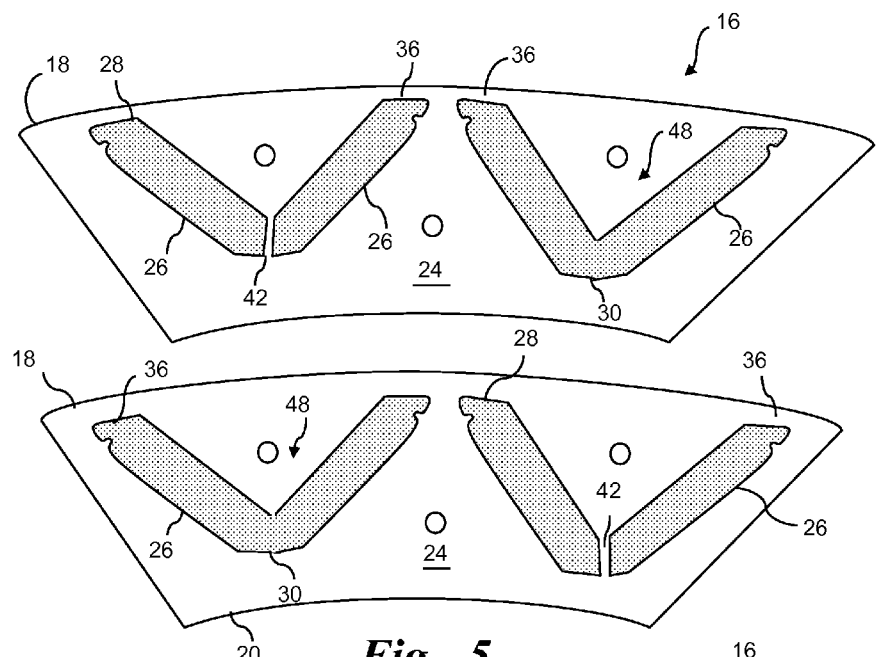
Fig. -5-
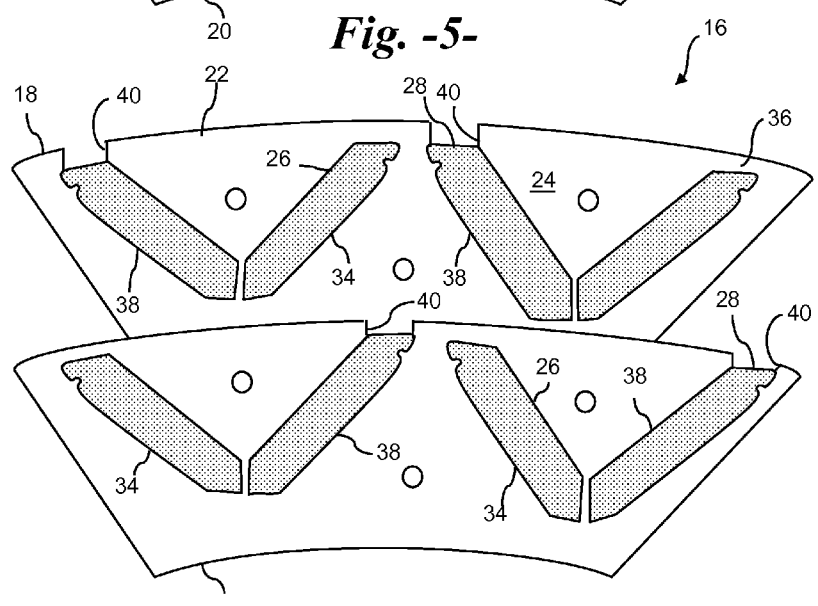
Fig. -6-

LAMINATION STACK FOR AN ELECTRICAL MACHINE ROTOR AND ASSOCIATED METHOD OF MAKING

FIELD OF THE INVENTION

The present subject matter relates generally to electrical machines and, more particularly, to a lamination stack for an electrical machine rotor that decreases permanent magnet flux leakage.

BACKGROUND OF THE INVENTION

Permanent magnet electrical machines, such as a generator or motor, generally include a stator and a rotor configured to convert mechanical power to electrical power or vice versa. The stator typically includes a plurality of stator teeth configured to receive coils or windings wrapped around the outer perimeter thereof. The rotor may be an interior permanent magnet (IPM) configuration wherein slots are defined in steel (or other magnetic material) laminations, wherein a permanent magnet material is retained in the slots.

While the IPM rotor has many advantages, centrifugal loading at high rotational speeds of the rotor is a limiting factor, and the slots are typically designed with structural circumferential "bridges" sufficient to withstand the mechanical stress of such forces and prevent the permanent magnets from being dislodged. The bridges may also be necessary simply for handling and assembly of the rotor, and are otherwise unnecessary for operation of the machine.

These bridges, however, create the problem of "shorting" or leakage of magnetic flux from the permanent magnet, causing a corresponding loss in efficiency of the machine. Flux leakage occurs when lines of flux from one pole of the magnet pass through the rotor bridge material without crossing the air gap and passing through the stator. In typical IPM rotor structures, it is estimated that about 15% of the magnetic material is not utilized or wasted as a result of this flux leakage. This is significant when considering the high cost of the permanent magnet material.

Prior attempts have been made to physically reduce the size of the rotor material bridges. However, it has been generally recognized that a minimum bridge thickness is required for mechanical stress purposes, as well as for physical handling and assembly of the rotor. Another rotor construction known in the art as a "pole cap design" attempts to eliminate the bridges altogether by using non-magnetic bolting techniques to mechanically attach the laminations and magnets to the rotor. This method, however, requires numerous fasteners and is considered cost prohibitive for many designs.

Accordingly, a rotor lamination stack with decreased flux leakage without sacrifice of structural integrity would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses an electrical machine permanent magnet rotor, which may serve as a motor or generator component. In a particular embodiment, the rotor includes a plurality of disc-shaped laminations arranged in a stacked configuration. Each of the laminations includes a plurality of magnetic material slots circumferentially spaced around a peripheral portion thereof, with the slots having an outer radial end. A first set of the slots on the laminations have a material bridge defined by the lamination material between the radial end and an outer circumference of the lamination. A second set of the slots on each of the laminations have radial ends that are void of a material bridge and extend to the outer circumference of the laminations. The second set of slots may be half or some other fraction of the total number of slots.

The magnetic material slots may be variously configured within the scope and spirit of the invention. In a particular embodiment, the slots of the first set alternate with the slots of the second set around the peripheral portion of the disc-shaped lamination such that every other slot includes a respective material bridge. With this embodiment, the slots may be axially aligned between adjacent laminations within the stack, wherein alternating slots of different laminations in the aligned axial direction include a respective material bridge.

In a further embodiment, the slots that are void of a material bridge may include a cutout in the outer circumferential edge of the lamination at the locations of the second set of slots. Thus, the cutouts remove any material bridge that may have been initially formed in the laminations for these respective slots. In this embodiment, the slots of the first set may alternate with the slots of the second set around the peripheral portion of the lamination such that every other slot includes a respective cutout.

In still a further embodiment, the slots of the first set alternate with the slots of the second set around the peripheral portion such that every other slot includes a respective material bridge. In addition, a lamination material "post" portion is defined at the radially inward end of the slots between every alternating pair of first and second slots, with the radially inward ends of the other pairs of slots being void of a post portion such that the radially inward ends share a continuous, common end.

The present invention also encompasses an electrical machine permanent magnet rotor wherein a plurality of disc-shaped laminations are arranged in a stacked configuration, with each of the laminations including a plurality of magnetic material slots circumferentially spaced around a peripheral portion thereof, with the slots having an outer radial end and an inner radial end. A first set of the slots on each of the laminations have a first tangential orientation, and a second set of the slots have a second tangential orientation generally opposite from the first tangential direction. The slots of the first set alternate with the slots of the second set around the peripheral portion and are oriented such that pairs of the slots have adjacent radially inward ends. A material post portion is defined between the radially inward ends for less than all of slot pairs. In other words, at least a certain amount of the slot pairs are void of a post portion at the radially inward ends.

In a particular embodiment, every other alternating pair of the slots has a post portion between the radially inward ends, with the other pairs of slots being void of the post portion and having a continuous shared radially inward end.

In a still further embodiment, the slots are axially aligned between adjacent laminations in the stack, and alternating pairs of the slots of different laminations in the aligned axial direction include a respective post portion.

The invention also encompasses various method embodiments for assembly of an electrical machine permanent magnet rotor from a plurality of disc-shape laminations, wherein each of the laminations includes a plurality of magnetic material slots circumferentially spaced around a peripheral portion thereof. One method embodiment includes defining the slots in the laminations such that less than all of the slots have a material bridge between an outer radial end of the slot and an outer circumference of the lamination. The method includes axially aligning the laminations into a stack such that the slots of different laminations are axially aligned in the stack.

In one embodiment, the method includes initially forming the laminations with open outer radial ends for the slots that are void of the material bridges.

In another embodiment, the method may include initially forming the laminations with material bridges at the outer radial ends of all of the slots, and subsequently removing the material bridges from at least certain of the slots after assembly of the laminations into the stacked configuration.

In yet another embodiment, a first set of the slots have an outer radial end that extends into an assembly tab formed on the outer circumference of the lamination, and a second set of the slots have a radial end disposed radially inward of the circumference. The method may include removing the assembly tabs such that the radial ends of the second set of slots extend to the outer circumference of the lamination and are void of a material bridge. In this embodiment, the slots of the first set alternate with the slots of the second set around the peripheral portion such that every other slot comprises a respective material bridge.

The method may also include axially aligning the laminations in the stack such that alternating slots of different laminations in the aligned axial direction include a respective bridge.

With still another method, the slots without material bridges may be defined by making cut-outs into the circumferential edge of the lamination, with the cut-outs extending to the outer radial end of the slots. The cut-outs may be made in alternating slots around the peripheral portion of the lamination such that every other slot has a respective cutout. Instead of every other slot, the cut-outs may be made in some other fraction of the total slots, for example, every third slot, and so forth. In an alternative embodiment, cut-outs may be made in all of the slots around the circumference of the lamination such that none of the slots have a respective material bridge.

A method embodiment may include defining an inner radial end of at least certain (or all) pairs of adjacent slots without a post portion such that the slots share a common continuous inner radial end.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a front view of a permanent magnet rotor for an electrical machine having a plurality of stacked laminations;

FIG. 2 is a partial in-line view of an embodiment of permanent magnet disc-shaped laminations for an electrical machine rotor in accordance with aspects of the invention;

FIG. 3 is a partial in-line view of the embodiment of the disc-shaped laminations of FIG. 2 after removal of the assembly tabs;

FIG. 4 is a partial in-line view of another embodiment of permanent magnet disc-shaped laminations for an electrical machine rotor in accordance with aspects of the invention;

FIG. 5 is a partial in-line view of a further embodiment of permanent magnet disc-shaped laminations for an electrical machine rotor in accordance with aspects of the invention; and FIG. 6 is a partial in-line view of still another embodiment of permanent magnet disc-shaped laminations for an electrical machine rotor in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As mentioned, the present subject matter is generally directed to a permanent magnet rotor, such as an interior permanent magnet (IPM) rotor, for an electrical machine. The rotor may be used as a component of a generator or a motor. In particular, the present subject matter is directed to a plurality of laminations having permanent magnet material slots that decrease flux leakage as compared to many conventional designs.

In several embodiments, it should be appreciated the present subject matter may be advantageously utilized with wind turbine generators, wherein the rotors must be capable of resisting large, electromagnetic or structural loads. However, it should be appreciated that rotors in accordance with the present subject matter are not limited to generators for wind turbines. Rather, the disclosed rotors may be utilized with electrical machines in any suitable application to decrease flux leakage without sacrificing structural integrity of the lamination stack.

Referring now to the drawings, FIG. 1 illustrates a front view of one embodiment of a rotor 10 that may be used in an electrical machine, such as a permanent magnet (PM) generator. The rotor 10 includes a shaft 12 that is configured for coupling to any manner of suitable rotational input source, such as a wind turbine drivetrain. The rotor 10 includes a plurality of permanent magnet disc-shaped laminations 16 in a stacked, axial configuration between end caps 14. As is commonly understood in the art, the permanent magnets are held in pockets or slots defined in the laminations 16 (as discussed in greater detail below). Various embodiments of the laminations 16 in accordance with aspects of the invention are discussed below.

Referring to FIG. 2, a partial in-line view of a plurality of rotor laminations 16 is disclosed. Each of the laminations 16 includes an outer circumferential edge 18 and inner edge 20. A plurality of magnetic material slots 26 are defined around a peripheral portion of the lamination 16 with a generally radial orientation between the edges 18 and 20. The slots 26 have an outer radial end 28 and an inner radial end 30. In the illustrated embodiment, the slots 26 have a tangential aspect relative to an axis (dashed line) of the rotor 10 such that pairs of the slots 26 form a generally V-shaped configuration. It should be appreciated, however, that the laminations 16 are not limited to any particular size, shape, or orientation of the magnetic material slots 26. The slots 26 contain any one or combination of permanent magnet material 32 known in the art as suitable for a permanent magnet rotor.

The plurality of laminations 16 are axially aligned in a stacked configuration (FIG. 1) and are typically bolted together with bolts (not illustrated) that extend axially through aligned bolt holes 22 in the stack of laminations 16.

The laminations 16 are formed of any manner of suitable base material 24, such as steel or other magnetic lamination material.

Referring to the embodiment of FIG. 3, the slots 26 are configured as a first set 34 of slots having a material bridge 36 defined by the lamination material 24 between the outer radial end 28 of the slot 34 and an outer circumferential edge 18 of the respective lamination 16. As discussed above, this material bridge 36 may be necessary in certain lamination configurations to provide an overall structural rigidity and integrity to the laminations 16. The bridges 36, however, may also lead to flux leakage, as discussed above.

Still referring to FIG. 3, a second set 38 of the slots on each of the laminations 16 has a radial end 28 that extends to the outer circumferential edge 18 of the respective lamination 16. In other words, the second set of slots 38 are void of the material bridge 36. The second set of slots 38 may be one-half or some other fraction of the total number of slots. Any manner of retaining notch 29 or other suitable retaining shape or configuration in the slot 26 is sufficient to prevent the permanent magnet material 32 from being displaced from the slot 26 at operational rotational speeds of the rotor even with the open outer radial end 28 of the second set of slots 38.

It can thus be appreciated that, for at least the embodiment of FIG. 3, at least half (or some other fraction) of the material bridges 36 are eliminated from the lamination 16, thereby significantly decreasing the path for flux leakage.

FIG. 2 depicts the embodiment of FIG. 3 in an initial formation stage wherein assembly tabs 44 are provided around the periphery of each of the laminations 16. In the illustrated embodiment, a respective assembly tab 44 is provided for every other slot 26 around the peripheral portion of each lamination 16. The respective slots are defined such that an extension portion 46 of the slot extends into the assembly tab 44. The assembly tabs 44 may also extend circumferentially over a plurality of the slots, for example so as to spiral continuously around the stack of laminations 16 (FIG. 1). It is often the case that the assembly tabs 44 are only necessary for handling and/or assembly of the laminations 16 into the stacked configuration of FIG. 1, and are otherwise unnecessary from a structural or operational standpoint. As depicted in FIG. 2, however, a material bridge is defined between the slot extensions 46 and the outer edges of the assembly tabs 44.

From the embodiment of FIG. 2, it can be appreciated that each of the pairs of slots 26 formed by adjacent first set 34 and second set 38 of the slots (the V-shaped pairs of slots 26) includes a material bridge 42 between the inner radial ends 30 of the respective pairs of slots. In other words, the radial ends 30 are separated by the lamination material 24 in the form of a radially extending post 42.

Referring to FIGS. 2 and 3, it can be appreciated that the embodiment of FIG. 3 may be defined from the laminations 16 depicted in FIG. 2 by elimination of the assembly tabs 44 after the laminations 16 have been aligned and configured in a stacked rotor core. The assembly tabs 44 may be cut or otherwise removed along the line 45 depicted in FIG. 2, which corresponds to the circumferential edge 18 of the laminations 16. This removal step results in formation of the second set of slots 38 having radial ends 28 that extend to the outer circumferential edge 18 of the respective lamination 16. As depicted in FIGS. 2 and 3, the slot retaining notches 29 lie radially inward of the cut line 45 in each lamination 16 so that this retaining structure is not removed with the assembly tab 44.

Referring again to FIG. 3, the first set 34 and second set 38 of slots may be arranged around the peripheral portion of the laminations 16 such that every other slot includes a material bridge 36. In other words, the first and second sets of slots 34, 38 may be alternately arranged around the peripheral portion of the laminations 16.

Still referring to FIG. 3, the laminations 16 may be arranged within the stack such that the slots 26 are axially aligned and alternating slots of different adjacent laminations 16 in the axial direction include a respective material bridge 36. For example, viewing the left-hand slots 26 in the aligned laminations 16, it can be seen that, in the axial direction (dashed line) the slots alternate between the first set 34 and second set 38.

FIG. 6 depicts an embodiment wherein the laminations 16 include material cutouts 40 in the outer circumferential edge 18 at the location of the radial ends 28 for the second set of slots 38. Thus, in this embodiment, the slots 26 forming the first set 34 and second set 38 have generally the same radial and tangential length, and the open end 28 of the second set of slots 38 is defined by the cutouts 40. In other words, a cutout 40 is provided at every other slot location around the peripheral portion of the laminations 16 and extends to the outer radial end 28 of the slots 26. The different laminations 16 may be axially aligned such that alternating slots of different adjacent laminations 16 in the axial direction include a respective cutout 40, as depicted in FIG. 7.

In the embodiment of FIG. 4, the laminations 16 include first set of slots 34 and second set of slots 38 configured with outer radial ends 28 as discussed above with respect to FIG. 3. In addition, a material post 42 defined between the inner radial ends 30 is eliminated for at least certain pairs of the slots 26 around the peripheral portion of each lamination 16. For example, referring to the left-hand set of slots 26 in the uppermost lamination 16 of FIG. 4, it can be appreciated that the slots are continuous at their respective inner radial ends 30. The material post 42 that is present in the right-hand pair of slots is eliminated. Elimination of the material post 42 in at least certain of the pairs of slots 26 is also effective in reducing flux leakage.

Still referring to FIG. 4, the different laminations 16 may be axially aligned in the rotor stack such that the alternating pairs of slots 26 of different adjacent laminations 16 in the axial direction are void of the material post 42, as depicted in FIG. 4.

Referring to FIG. 5, a configuration of a plurality of laminations 16 is provided wherein the outer radial ends 28 of the slots 26 each include a material bridge 36 between the slot 26 and the outer circumferential edge 18 of each respective lamination 16. However, at least certain pairs 48 of the slots 26 are defined without a material post portion 42 at the inner radial end 30 of the slots, as discussed above with respect to FIG. 4. In the embodiment depicted in FIG. 5, every other pair 48 of the slots 26 is without a material post portion 42. The different laminations 16 within the axially stacked configuration may be arranged such that alternating pairs of slots in the aligned axial direction of different adjacent laminations 16 are joined at the inner radial end 30 (e.g., void of the material post 42), as depicted in FIG. 5.

The present invention also encompasses various method embodiments for assembly of a permanent magnet rotor 10 from a plurality of disc-shaped laminations 16. Referring to the figures in general, one method embodiment includes defining slots 26 in the laminations 16 such that less than all of the slots 26 have a material bridge 36 between the outer radial end 28 of the slot and an outer circumferential edge 18 of the lamination. The method may include axially aligning the laminations into a stack such that the slots 26 of different laminations 16 are axially aligned in the stack.

In one embodiment, the method may include initially forming the laminations with an open outer radial end 28 for the slots 26 that are void of the material bridges 36. This may be accomplished by, for example, initially cutting the slots 26 into the lamination material 24 to eliminate the material bridge from certain ones of the slots 26.

In an alternate embodiment, referring to the discussion of FIGS. 2 and 3 above, the method may include forming the laminations 16 with material bridges 36 at the outer radial ends 28 of all of the slots 26, and subsequently removing the material bridges 36 from at least certain of the slots after assembly of the laminations 16 into a stacked configuration. For example, a first set of the slots may have an outer radial end 28 that extends into an assembly tab 44, as discussed above with respect to FIG. 2, wherein the method includes removing the assembly tabs 44 such that the radial ends 28 of a second set 38 of the slots extends to the outer circumferential edge 18 of the laminations 16 and are void of a material bridge 36.

In yet another method embodiment depicted for example in FIG. 6, the slots 26 without a material bridge 36 may be defined by making cutouts 40 into the circumferential edge 18 of the laminations 16, with the cutouts 40 extending to the outer radial ends of at least certain ones of the slots 26. The cutouts 44 may be made in alternating slots around the peripheral portion of the laminations 16 such that every other slot 26 has a respective cutout 44.

In still a further embodiment, the cutouts 40 may be made in all of the slots 26 around the circumference of the laminations 16 such that none of the slots 26 has a respective material bridge.

Other method embodiments may include defining the inner radial end 30 of at least certain (or all) pairs of adjacent slots 26 without a post portion 42 such that the slots share a common continuous inner radial end 30, as discussed above with respect to the configuration of FIG. 5.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An electrical machine permanent magnet rotor, comprising:
   a plurality of disc-shaped laminations arranged in a stacked configuration;
   each of said laminations further comprising a plurality of magnetic material slots circumferentially spaced around a peripheral portion thereof, each of said slots having a single outer radial end and a single radially inward end;
   a first set of said slots on each of said laminations having a material bridge between said outer radial end and an outer circumferential edge of said lamination; and
   a second set of said slots on each of said laminations have said outer radial ends extending to said outer circumferential edge of said laminations and;
   wherein said slots of said first set alternate with said slots of said second set around said peripheral portion such that every other said slot comprises a respective said material bridge.

2. The electrical machine permanent magnet rotor of claim 1, wherein said slots of adjacent said laminations are axially aligned, and alternating slots of different said laminations in the aligned axial direction include a respective said material bridge.

3. The electrical machine permanent magnet rotor of claim 1, wherein said laminations comprise cutouts in said outer circumferential edge at the locations of said second set of slots.

4. The electrical machine permanent magnet rotor of claim 3, wherein said slots of said first set alternate with said slots of said second set around said peripheral portion such that every other said slot comprises a respective said cutout.

5. The electrical machine permanent magnet rotor of claim 1, wherein said slots of said first set alternate with said slots of said second set around said peripheral portion such that every other said slot comprises a respective said material bridge, and further comprising a post portion between every alternating pair of first and second slots at a radially inward end of said slots.

6. The electrical machine permanent magnet rotor of claim 1, wherein said slots of said first set alternate with said slots of said second set around said peripheral portion such that every other said slot comprises a respective said material bridge, and further comprising a post portion between every other alternating pair of first and second slots at a radially inward end of said slots.

7. An electrical machine permanent magnet rotor, comprising:
   a plurality of disc-shaped laminations arranged in a stacked configuration;
   each of said laminations further comprising a plurality of magnetic material slots circumferentially spaced around a peripheral portion thereof, said slots having an outer radial end and an inner radial end;
   a first set of said slots on each of said laminations having a first orientation;
   a second set of said slots on each of said laminations having a second orientation generally opposite from said first direction;
   said slots of said first set alternating with said slots of said second set around said peripheral portion and oriented such that pairs of said alternating slots form a V-shaped configuration and have adjacent radially inward ends;
   a post portion between said radially inward ends of less than all of said pairs of slots; and
   wherein every other alternating pair of said alternating slots has a post portion between said radially inward ends and said radially inward ends of said other pairs of slots merge such that said slots have a continuous shared radially inward end.

8. The electrical machine permanent magnet rotor of claim 7, wherein said slots of adjacent said laminations are axially aligned, and alternating pairs of said slots of different said laminations in the aligned axial direction include a respective said post portion.

* * * * *